US012618999B2

(12) United States Patent
Chang et al.

(10) Patent No.: US 12,618,999 B2
(45) Date of Patent: May 5, 2026

(54) PHOTOELECTRIC FUSION IN-SITU DETECTION DEVICE AND METHOD FOR THERMAL VOLATILE GASES AND THERMAL EVOLUTION STAGES OF UNDERGROUND OIL SHALE

(71) Applicant: JILIN UNIVERSITY, Jilin (CN)

(72) Inventors: Zhiyong Chang, Jilin (CN); Cheng Kong, Jilin (CN); Chengxin Song, Jilin (CN); Xiangyu Luan, Jilin (CN); Xiaohui Weng, Jilin (CN); Zongwei Yao, Jilin (CN); Tao Zhang, Jilin (CN); Ruochen An, Jilin (CN); Sunhua Deng, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 284 days.

(21) Appl. No.: 18/520,402

(22) Filed: Nov. 27, 2023

(65) Prior Publication Data

US 2025/0172718 A1      May 29, 2025

(51) Int. Cl.
| | |
|---|---|
| *G01V 9/00* | (2006.01) |
| *E21B 49/08* | (2006.01) |
| *G01V 11/00* | (2006.01) |

(52) U.S. Cl.
CPC ............ *G01V 9/007* (2013.01); *E21B 49/081* (2013.01); *G01V 11/002* (2013.01)

(58) Field of Classification Search
CPC ...... G01V 9/007; G01V 11/002; E21B 49/081
See application file for complete search history.

(56) References Cited

FOREIGN PATENT DOCUMENTS

| | | | | | |
|---|---|---|---|---|---|
| CN | 116087426 A | * | 5/2023 | ......... | G01N 33/0014 |
| GB | 2444276 A | * | 6/2008 | ......... | G01N 33/2841 |

* cited by examiner

*Primary Examiner* — Laura Martin
*Assistant Examiner* — Anthony W Megna Fuentes
(74) *Attorney, Agent, or Firm* — JCIPRNET

(57)      ABSTRACT

The present disclosure relates to a dust-removed odor sampling device for oil shale and a photoelectric fused method for underground in-situ exploration and thermal evolution stage monitoring of oil shale, belonging to the technical field of oil shale in-situ exploration and exploitation. The present disclosure includes: establishing an dust-removed odor sampling device, which includes an imitation sandfish lizard dustproof chamber, an imitation leaf filter membrane, a single-chip microcomputer controller, a dust collection box, a solenoid valve and an air pump; using a redesigned $F_\beta$ score and a feature selection algorithm to optimize a gas sensor array and reduce the apparatus volume and energy consumption; and combining the optimized gas sensor array with the optical gas detector to realize the underground in-situ exploration and thermal evolution stage monitoring of oil shale by the photoelectric fusion method.

4 Claims, 9 Drawing Sheets

PHOTOELECTRIC FUSION IN-SITU DETECTION DEVICE AND METHOD FOR THERMAL VOLATILE GASES AND THERMAL EVOLUTION STAGES OF UNDERGROUND OIL SHALE

BACKGROUND

Technical Field

The present disclosure belongs to the technical field of oil shale in-situ exploration and exploitation, and in particular, relates to a photoelectric fusion in-situ detection device and method for thermal volatile gases and thermal evolution stage (i.e., cracking state) of underground oil shale.

Description of Related Art

Oil shale is a sedimentary rock rich in kerogen organic matter, which is expected to be commercially developed through in-situ conversion technology and can be used as a supplementary energy source for traditional oil and gas. The oil shale has huge reserves on earth, and the exploitation and utilization of the oil shale are mainly affected by the effect of exploration and the thermal evolution stage monitoring of oil shale during exploitation. On the one hand, exploration of oil shale can evaluate the abundance of organic matter inside the oil shale, and type and evolution of the kerogen, so as to determine the exploitation value of the mine and guide subsequent exploitation. On the other hand, real-time thermal evolution stage monitoring of oil shale is conducive to quickly correcting the heating and pressure control process, reducing costs and improving energy return rate. Therefore, underground in-situ exploration and thermal evolution stage monitoring of oil shale are conducive to achieving accurate evaluation of oil shale deposit value and real-time monitoring of the mining process, guiding the selection of on-site conversion technology and regulation of the engineering process, to assist the efficient exploitation of underground oil and gas resources.

Traditional exploration and evaluation of oil shale generally rely on on-site geological survey, drilling coring and further laboratory testing and analysis. The methods widely used for qualitative or quantitative monitoring of cracking process of oil shale include directly measuring vitrinite reflectance of rock samples, using spectral techniques to analyze structure and composition of rock, and establishing a numerical simulation method based on dynamic data obtained from pyrolysis experiments or data from actual mining. At present, these methods for the underground in-situ exploration and the thermal evolution stage monitoring of oil shale usually require complex sample preparation and analysis in the laboratory, which is time-consuming, expensive and cannot meet the requirements of in-situ real-time monitoring.

The organic matter type, abundance, maturity and thermal evolution stage of oil shale can be accurately judged and monitored in real time through the qualitative and quantitative accurate detection of oil shale with different qualities and a multi-component gas generated in the process of cracking. As a rapidly developing gas detection technology, a gas sensor array has the advantages of high efficiency, fast speed, low cost, simple operation, and on-site real-time detection, and so on, and is receiving increasing attention in energy field. Optical gas detection technology converts a signal of gas molecules interacting with photons into an electrical signal, which has the advantages of good selec-tivity, high sensitivity, strong stability, and short response time and has been widely used in real-time monitoring of various gases in various environments. By using the gas sensor array and the optical gas detection technology, it is expected to realize rapid underground in-situ exploration and real-time thermal evolution stage monitoring of oil shale. However, the application of the two gas detection technologies in the field of in-situ exploration and in-situ real-time thermal evolution stage monitoring of oil shale still faces three key technical problems that need to be solved urgently. Firstly, in the process of the underground in-situ exploration and thermal evolution stage monitoring of oil shale, particles such as rock debris will adhere to surfaces of gas-sensitive detectors and an optical apparatus, which will affect the accuracy of the sensors and greatly damage the effect of exploration and monitoring. Secondly, too many sensors are easy to cause problems such as large apparatus volume and high energy consumption, which is not conducive to assembling of apparatus during oil shale exploration and exploitation. More importantly, currently the gas sensor arrays alone or the optical gas detection apparatus alone cannot achieve reliable underground in-situ exploration and thermal evolution stage monitoring of oil shale due to key technical defects. On the one hand, although the gas sensor arrays can detect the multi-component gas in real-time, they have a low accuracy and a high detection limit for single specific gases. On the other hand, although the optical gas detection technology provides more accurate detection results for the single specific gases, its real-time detection of the multi-component gas requires the use of a tunable light sources capable of covering a absorption wavelength of the multi-component gas or direct use of a spectrometer for detection. However, these devices have a larger volume and a higher cost than a light source emitting a fixed wavelength, and the tunable light source emitting a limited range of wavelengths cannot guarantee the detection of all types of gases in the multi-component gas.

SUMMARY

The present disclosure proposes a real-time and reliable device and method for underground in-situ exploration and thermal evolution stage monitoring of oil shale using bionics and machine learning technology. In order to solve the problem of rock debris particle interference, the chamber structure was optimized in dustproof sampling by a biomimetic technology using biological properties. The sandfish lizard is a desert animal living in an environment with a lot of sand and dust particles. The special structure of its nasal cavity can enable the sand particles inhaled into the nasal cavity to be blocked in a specific area at the front of the nasal cavity, the sand particles that are blocked and gathered in the nasal cavity are ejected from the body through intense coughing and exhalation. Therefore, the nasal structure of the sandfish lizard and the behavior of vigorous exhalation to remove sand particles from the nasal cavity are applied to the sampling chamber structure and sampling method of a multi-gas-sensitive sensing system. A large number of plant leaves have a unique structure that enables them to capture particles in the air, and at the same time, a large number of stomas distributed on surfaces of the leaves have the ability to intercept and block particles while enriching the particles on the leaves. Therefore, a biomimetic flexible filter membrane is combined for secondary filtration to ensure that the sensor array is not affected by fine particles and achieve dust sampling in multiple gas sensing systems. In order to solve the problem of large apparatus size and high energy consumption, a $F_\beta$ score in machine learning is redesigned to achieve an optimal balance between the accuracy of oil shale state detection and the number of sensors deployed, a CatBoost algorithm is used to sort the features according to the importance of output features, and then sort the sensors to remove a redundant sensor, and is integrated with a feature selection algorithm to further improve classification performance and stability. In order to solve the problem of the poor reliability when monitoring using a gas sensor array or an optical gas detection technology alone, the gas sensor array and an optical gas detector are organically combined for photoelectric fusion detection, and the optimized gas sensor array and the optical gas detector are placed underground for in-situ real-time exploration and thermal evolution stage monitoring of oil shale. An optimized gas sensor array combined with the optical gas detector is used to jointly detect a multi-component gas generated in a process of cracking of oil shale, and an XGBoost classifier, random forest regression analysis algorithm, support vector machine regression analysis algorithm and convolutional neural network classifier are used to determine organic matter type, abundance, maturity and thermal evolution stage of oil shale. At the same time, when the cracking of oil shale enters an organic matter decomposition stage, a heating temperature and formation pressure are rapidly adjusted in real time according to a methane concentration measured by the optical gas detector in real time so as to control a reaction process of underground in-situ conversion of organic matter in the oil shale and improve energy return rate.

To achieve the above objects, the following technical solutions are adopted in the present disclosure:

A. dustproof chamber; B. filter membrane; C. single chip microcomputer controller; D. dust collection box; a1. jack I; a2. jack II; a3. jack III; a4. jack IV; c1. control unit; c2. signal acquisition unit;

1. solenoid valve I; 2. air pump; 3. solenoid valve II; 4. air inlet channel; 5. diffusion channel; 6. dust settlement channel; 7. sensing channel; 8. dust collection channel; 9. dust passage pipe; 10. dust collection chamber; 11. filter screen; 12. gas-sensitive sensor array; 13. A/D acquisition module (analog-to-digital acquisition module, for converting an analog signal into a digital signal); 14. touch display screen; 15. power supply; dust-removed odor sampling device 16; laser 17; laser driver 18; detector 19; gas absorption pool 20; signal generator 21; lock-in amplifier 22; data acquisition card 23; data acquisition instrument 24; filter noise reduction circuit 25; cooling device 26; temperature sensor 27; pressure sensor 28; oil shale underground in-situ conversion heating device 29; formation pressure control device 30; optical gas detector 31.

1. A dust-removed odor sampling device (16) for oil shale, which includes a dustproof chamber (A), a filter membrane (B), a single-chip microcomputer controller (C), a dust collection box (D), a solenoid valve I (1), an air pump (2), and a solenoid valve II (3), where the solenoid valve I (1), the dustproof chamber (A), the filter membrane (B), the single-chip microcomputer controller (C), the air pump (2), and the solenoid valve II (3) are arranged sequentially from front to rear;

the dustproof chamber (A) is a three-way pipe, on which an air inlet channel (4), a diffusion channel (5), a dust settlement channel (6), a sensing channel (7) and a dust collection channel (8) are provided, an upper part of the sensing channel (7) is provided with a jack I (a1), a jack II (a2), a jack III (a3) and a jack IV (a4) of a gas-sensitive sensor array (12); the air inlet channel (4) is a circular cross-section straight pipe with an inner diameter d1=10-12 mm; the diffusion channel (5) is an inclined pipe formed by lofting a front circular cross-section and a rear circular cross-section, where centers of circles of the front and rear cross-sections are at a same horizontal line and the circles are tangent to each other, an inner diameter of the front cross-section is d1=10-12 mm, and an inner diameter of the rear cross-section is d2=28-30 mm;

the dust settlement channel (6) is formed by lofting a front circular cross-section and a rear semi-circular cross-section, centers of circles of the front and rear cross-sections are concentric, and inner diameters of the front and rear cross-sections are d2=28-30 mm; the sensing channel (7) is a circular cross-section bend pipe with an inner diameter d4=10-12 mm and an outer diameter d5=12-14 mm; distances between centers of circles of the jack I (a1), jack II (a2), jack III (a3) and jack IV (a4) are L1=15-18 mm, inner diameters of them are d3=8-9 mm, and heights of all jacks in relative to height of center of cross-section of the air inlet channel are L2=60-62 mm; the dust collection channel (8) is formed by lofting an upper elliptical cross-section and a lower circular cross-section, and circles of the upper and lower cross-sections are tangent to each other in their rear directions;

the single-chip microcomputer controller (C) includes a control unit (c1), a signal acquisition unit (c2), a touch display screen (14), and a power supply (15), where the control unit (c1) includes the solenoid valve I (1) and the solenoid valve II (3); the signal acquisition unit (c2) includes the gas-sensitive sensor array (12) and an A/D acquisition module (13); the control unit (c1), the signal acquisition unit (c2), and the touch display screen (14) are connected to the power supply (15) through wires;

the dust collection box (D) includes a dust passage pipe (9), a dust collection chamber (10), and a filter screen (11), where the dust passage pipe (9) is fixedly connected to and communicated with a center of an upper end of the dust collection chamber (10), and the filter screen (11) is fixedly connected to a lower end of the dust collection chamber (10); an upper end of the dust passage pipe (9) is threaded to a lower end of the dust collection channel (8), an outer diameter of the dust collection chamber (10) as cylinder is d6=40-45 mm, and a diameter of mesh of the filter screen (11) is d7=0.3-0.5 mm;

the solenoid valve I (1) is communicated with the air inlet channel (4) of the dustproof chamber (A); the gas-sensitive sensor array (12) is fixedly connected to the jack I (a1), jack II (a2), jack III (a3) and jack IV (a4) respectively of the sensing channel (7) of the dustproof chamber (A);

the air pump (2) is communicated with a rear part of the sensing channel (7) of the dustproof chamber (A);

the dust collection box (D) is communicated with a lower part of the dust collection channel (8) in the dustproof chamber (A) through the solenoid valve II (3);

the single-chip microcomputer controller (C) is connected with the solenoid valve I (1) and the solenoid valve II (3) through wires, the single-chip microcomputer controller (C) is connected with the gas-sensitive sensor array (12) and powered through the power supply (15), and a voltage signal transformation generated by the gas-sensitive sensor array is collected, recorded and stored through the A/D acquisition module (13).

2. A production method of a filter membrane (B) is characterized by including the following steps:

step S1: mixing a PDMS polymer and a curing agent at a ratio of 10:1, and adding them to solvent FC-43 at 20 wt % for mechanical stirring for 10 min, step S2: applying solution prepared in step S1 to a pure silicon mold with a pit array, and then placing the mold into a microwave oven for 3 min of radiation, step S2 specifically includes: the pure silicon mold has a height of L5=25-30 mm, an inner slot thereof has a diameter of d8=10-12 mm and a height of L7=15-20 mm, and distances between centers of cells of a cylindrical cell array arranged in the inner slot are L4=15-20 μm, depths of the cells are L6=6-8 μm and diameters of the cells are d9=12-16 μm, the single-chip microcomputer controller (C) includes a control unit (c1), a signal acquisition unit (c2), a touch display screen (14) and a power supply (15), where the control unit (c1) includes a solenoid valve I (1) and a solenoid valve II (3); the signal acquisition unit (c2) includes a gas-sensitive sensor array (12) and an A/D acquisition module (13); the control unit (c1), the signal acquisition unit (c2) and the touch display screen (14) are connected to a power supply (15) through wires.

3. The dust-removed odor sampling device (16) for oil shale where the dustproof chamber (A) is a three-way pipe, on which an air inlet channel (4), a diffusion channel (5), a dust settlement channel (6), a sensing channel (7) and a dust collection channel (8) are provided, an upper part of the sensing channel (7) is provided with a jack I (a1), a jack II (a2), a jack III (a3) and a jack IV (a4) of a gas-sensitive sensor array (12); the air inlet channel (4) is a circular cross-section straight pipe with an inner diameter d1=10-12 mm; the diffusion channel (5) is an inclined pipe formed by lofting a front circular cross-section and a rear circular cross-section, where centers of circles of the front and rear cross-sections are at a same horizontal line and the circles are tangent to each other, an inner diameter of the front cross-section is d1=10-12 mm, and an inner diameter of the rear cross-section is d2=28-30 mm;

the dust settlement channel (6) is formed by lofting a front circular cross-section and a rear semi-circular cross-section, centers of circles of the front and rear cross-sections are concentric, and inner diameters of the front and rear cross-sections are d2=28-30 mm; the sensing channel (7) is a circular cross-section bend pipe with an inner diameter d4=10-12 mm and an outer diameter d5=12-14 mm; distances between centers of circles of the jack I (a1), jack II (a2), jack III (a3) and jack IV (a4) are L1=15-18 mm, inner diameters of them are d3=8-9 mm, and heights of all jacks in relative to height of center of cross-section of the air inlet channel are L2=60-62 mm; the dust collection channel (8) is formed by lofting an upper elliptical cross-section and a lower circular cross-section, and circles of the upper and lower cross-sections are tangent to each other in their rear directions;

the dust collection box (D) includes a dust passage pipe (9), a dust collection chamber (10), and a filter screen (11), where the dust passage pipe (9) is fixedly connected to and communicated with a center of an upper end of the dust collection chamber (10), and the filter screen (11) is fixedly connected to a lower end of the dust collection chamber (10); an upper end of the dust passage pipe (9) is threaded to a lower end of the dust collection channel (8), an outer diameter of the dust collection chamber (10) as cylinder is d6=40-45 mm, and a diameter of mesh of the filter screen (11) is d7=0.3-0.5 mm.

4. A photoelectric fusion method for underground in-situ exploration and thermal evolution stage monitoring of oil shale where the method is based on the dust-removed odor sampling device (16) for oil shale discussed above, and specifically includes the following steps:

step 4.1, according to composition of a volatile gas of oil shale and a change process of a concentration of a gas component during thermal evolution stage, taking a gas whose concentration changes significantly with decomposition of organic matter of oil shale as a target gas of an optical gas detector (31), and recording the target gas as G;

step 4.2, constructing the optical gas detector (31), which includes: a laser (17), a gas absorption pool (20), a detector (19), a laser driver (18), a signal generator (21), a lock-in amplifier (22), and a data acquisition card (23);

step 4.3, constructing an initial gas sensor array: according to type of a gas compound volatilized from oil shale in different states, selecting other gas sensor except the target gas G in step 4.1, to construct an initial gas senor array that is capable of monitoring all heat volatile gases, where the different states of oil shale include organic matter abundance, kerogen type and thermal evolution stage;

step 4.4, obtaining, by using the initial gas sensor array constructed in step 4.3, effective odor data, including the following steps:

step 4.4.1, constructing a signal acquisition system by using the initial gas sensor array, together with an air pump, a filter noise reduction circuit (25) and a data acquisition instrument (24), and heating oil shale sample according to a heat-injection in-situ mining method of oil shale; converting, by the signal acquisition system, an odor into numerical data that is easy to be processed, where n odor samples are collected and recorded as set $S=\{s_1, s_2, s_3, \ldots, s_n\}$;

step 4.4.2, obtaining the thermal evolution stage of oil shale through an accurate laboratory measurement, recording it as set $L=\{l_1, l_2, \ldots, l_k\}$, and corresponding it to the odor samples to form a training set $$T = \{s_1^l, s_2^l, s_3^l, \ldots, s_n^l\},$$

where $l \in L$;

step 4.5, extracting and fusing multi-phase features of the training set of oil shale, including the following steps:

step 4.5.1, extracting, by a plurality of steady-state feature extraction methods, a steady-state feature of each sample to form a steady-state feature vector, which is recorded as $F_s$;

step 4.5.2, extracting, by a plurality of transient feature extraction methods, a transient feature of each sample to form a transient feature vector, which is recorded as $F_t$;

step 4.5.3, fusing the steady-state feature vector and the transient feature vector extracted from each sample to form a final feature vector $F=(F_s, F_t)$;

step 4.6, sorting each feature in the final feature vector based on its importance, including the following steps:

step 4.6.1, calculating the importance of each feature by using a filtering method in feature selection and sorting each feature;

step 4.6.2, calculating the importance of each feature by using an embedding method in feature selection and sorting each feature;

step 4.6.3, sorting each feature by obtaining an average value and combining sequence numbers obtained by multiple sorting methods to obtain a final sorting of features;

step 4.7, utilizing $$F'_\beta$$

score to achieve selection of an optimal feature subset, including the following steps:

step 4.7.1, recognizing, by using numerous classifiers in machine learning, a state of oil shale on the training set to determine a classifier with best recognition effect and use it as a feature subset selection classifier, where a 10-fold cross-validation is used for evaluation in an evaluation process of the classifiers;

step 4.7.2, generating different number of feature subsets based on sorting of the features, and evaluating each feature subset by an improved $F_\beta$ score, $$F'_\beta = \left(1 + \beta^2\right) \times \frac{\frac{d-m}{d-1} \times \text{accuracy}}{\left(\beta^2 \times \frac{d-m}{d-1}\right) + \text{accuracy}},$$

where d is feature number in the final feature vector F, m is feature number in the feature subset, accuracy is an recognition rate of an established model for state prediction of oil shale, and $\beta$ is an optimization parameter representing a relative importance of the recognition rate and the feature number;

step 4.8, finding gas sensors corresponding to features in the optimal feature subset, to jointly form an optimized sensor array;

step 4.9, establishing a photoelectric fused system for underground in-situ exploration and thermal evolution stage monitoring of oil shale: a miniaturized sensor array obtained after optimizing the sensor array, together with the optical gas detector (31), a cooling device (26), a temperature sensor (27), a pressure sensor (28), an oil shale underground in-situ conversion heating device (29), and a formation pressure control device (30) constitute the photoelectric fused system for underground in-situ exploration and thermal evolution stage monitoring of oil shale;

step 4.10, using the photoelectric fused system for underground in-situ exploration and thermal evolution stage monitoring of oil shale to realize underground in-situ exploration of oil shale, including the following steps:

step 4.10.1, for oil shales with different kerogen types, measuring their kerogen types accurately in laboratory, to constitute a label set, which is recorded as set $$G_1 = \left\{g_1^1, g_2^1, g_3^1, \dots, g_k^1\right\},$$

and meanwhile, collecting, by using the photoelectric fused system for underground in-situ exploration and thermal evolution stage monitoring of oil shale, volatile gas information of oil shale, which is recorded as set $$H_1 = \left\{h_1^1, h_2^1, h_3^1, \dots, h_k^1\right\},$$

and combining $G_1$ and $H_1$ to constitute a training set $$J_1 = \left\{f_{h_1^1}^g, f_{h_2^1}^g, f_{h_3^1}^g, \dots, f_{h_k^1}^g\right\},$$

where $g \in G_1$;

step 4.10.2, extracting features of the set $J_1$ using a feature extraction method to constitute a feature set, which is recorded as $$F_j^1;$$

step 4.10.3, constructing, by using a bionic intelligent mode recognition method and taking the feature $$F_j^1$$

as input, a classification model, which is recorded as $A_1$, for determining type of organic matter kerogen of oil shale;

step 4.10.4, for oil shales with different abundances, measuring their abundances accurately in laboratory, to constitute a label set, which is recorded as set $$G_2 = \left\{g_1^2, g_2^2, g_3^2, \dots, g_k^2\right\},$$

and meanwhile, collecting, by using the photoelectric fused system for underground in-situ exploration and thermal evolution stage monitoring of oil shale, volatile gas information of oil shale, which is recorded as set $$H_2 = \left\{h_1^2, h_2^2, h_3^2, \dots, h_k^2\right\},$$

and combining $G_2$ and $H_2$ to constitute a training set, $$J_2 = \left\{f_{h_1^2}^g, f_{h_2^2}^g, f_{h_3^2}^g, \dots, f_{h_k^2}^g\right\},$$

where $g \in G_2$;

step 4.10.5, extracting features of the set $J_2$ using a feature extraction method to constitute a feature set, which is recorded as $$F_j^2;$$

step 4.10.6, constructing, by using a regression analysis method and taking the feature $$F_j^2 \qquad 5$$

as input, a prediction model, which is recorded as $A_2$, for determining abundance of organic matter of oil shale;

step 4.10.7, for oil shales with different maturities, measuring their maturity stages and maturity values accurately in laboratory, where the maturity stages constitute a label set, which is recorded as set $$G_3 = \{g_1^3, g_2^3, g_3^3, \dots , g_k^3\},$$

the maturity values constitute a label set, which is recorded as set $$G_4 = \{g_1^4, g_2^4, g_3^4, \dots , g_k^4\},$$

and meanwhile, collecting, by using the photoelectric fused system for underground in-situ exploration and thermal evolution stage monitoring of oil shale, volatile gas information of oil shale, which is recorded as set $$H_3 = \{h_1^3, h_2^3, h_3^3, \dots , h_k^3\},$$

combining $G_3$ and $H_3$ to constitute a training set, $$J_3 = \left\{ f_{h_1^3}^g, f_{h_2^3}^g, f_{h_3^3}^g, \dots , f_{h_k^3}^g \right\},$$

where $g \in G_3$; and combining $G_4$ and $H_3$ to constitute a training set $$J_4 = \left\{ f_{h_1^3}^g, f_{h_2^3}^g, f_{h_3^3}^g, \dots , f_{h_k^3}^g \right\},$$

where $g \in G_4$;

step 4.10.8, extracting features of the set $J_3$ using a feature extraction method to constitute a feature set, which is recorded as $$F_j^3; \qquad 55$$

step 4.10.9, constructing, by using a bionic intelligent mode recognition method and taking the feature $$F_j^3$$

as input, a classification model, which is recorded as $A_3$, for determining maturity stage of organic matter of oil shale;

step 4.10.10, extracting features of the set $J_4$ using a feature extraction method to constitute a feature set, which is recorded as $$F_j^4;$$

step 4.10.11, constructing, by using a regression analysis method and taking the feature $$F_j^4$$

as input, a prediction model, which is recorded as $A_4$, for determining maturity of organic matter of oil shale;

step 4.10.12, heating an oil shale undergoing underground in-situ exploration, and converting, by using the photoelectric fused system for underground in-situ exploration and thermal evolution stage monitoring of oil shale, odor into numerical data, which is easy to be processed and recorded as sample x;

step 4.10.13, extracting a feature of a sample x using a feature extraction method and recording it as $F_x$;

step 4.10.14, determining, by using the classification model $A_1$ of the type of organic matter kerogen of oil shale as constructed in step 4.10.3 and taking the feature $F_x$ as input, the type of organic matter kerogen of oil shale belongs to which one of kerogen types I, II and III;

step 4.10.15, determining, by using the prediction model $A_2$ of the abundance of organic matter of oil shale as constructed in step 4.10.6 and taking the feature $F_x$ as input, the abundance of organic matter of oil shale;

step 4.10.16, determining, by using the classification model $A_3$ of the maturity stage of organic matter of oil shale as constructed in step 4.10.9 and taking the feature $F_x$ as input, the maturity of organic matter of oil shale is in which stage of three stages, i.e., dehydration, organic matter decomposition and semi-coke mineral decomposition;

step 4.10.17, determining, by using the prediction model $A_4$ of the maturity of organic matter of oil shale as constructed in step 4.10.11 and taking the feature $F_x$ as input, the maturity of organic matter of oil shale;

step 4.10.18, according to the kerogen type, abundance, maturity stage and maturity value of organic matter of oil shale obtained in steps 4.10.14 to 4.10.17, evaluating mineral value of oil shale accurately and guiding on-site conversion technology selection and engineering process design to assist efficient in-situ exploitation of underground oil and gas resources;

step 4.11, using the photoelectric fused system for underground in-situ exploration and thermal evolution stage monitoring of oil shale to realize underground in-situ thermal evolution stage monitoring of oil shale, including the following steps:

step 4.11.1, monitoring a pyrolysis process of oil shale undergoing underground in-situ conversion, and converting, by using the photoelectric fused system for underground in-situ exploration and thermal evolution stage monitoring of oil shale, odor information into numerical data, which is easy to be processed and recorded as sample w;

step 4.11.2, extracting a feature of a sample w using a feature extraction method and recording it as $F_w$;

step 4.11.3, determining, by using the classification model $A_3$ of maturity stage of organic matter of oil shale as constructed in step 4.10.9 and taking the feature $F_w$ as input, maturity of organic matter of oil shale is in which stage of three stages, i.e., dehydration, organic matter decomposition and semi-coke mineral decomposition;

step 4.11.4, if the maturity of organic matter of oil shale as determined in step 4.11.3 is in stage of the organic matter decomposition, then separately analyzing a gas concentration signal of the target gas G obtained by a mid-infrared laser gas sensing system in the photoelectric fused system for underground in-situ exploration and thermal evolution stage monitoring of oil shale, where an unit time is recorded as o, a set constituted by p unit times is recorded as $O=\{o_1, o_2, o_3, \ldots, o_p\}$, an average concentration of the target gas G in each unit time o is used as a representative gas concentration in this unit time and its set is recorded as $C=\{c_1, c_2, c_3, \ldots, c_p\}$, and a change rate of concentration of the target gas G in each unit time o is recorded and its set is recorded as $R=\{r_1, r_2, r_3, \ldots, r_p\}$;

step 4.11.5, if $r_1 > r_{i-1}$, where $1 < i < m$, and $2 < m \leq p$, where p represents the number of unit time, then adjusting the oil shale underground in-situ conversion heating device (29) and the formation pressure control device (30) to increase an underground in-situ conversion heating temperature and formation pressure of oil shale, with subsequent steps as follows:

step 4.11.5.1, if $r_{i+1} > r_i$, where $1 < i < m$, and $2 < m \leq p$, where p represents the number of unit time, then maintaining the underground in-situ conversion heating temperature and the formation pressure of oil shale;

step 4.11.5.2, if $r_{i+1} \leq r_1$, where $1 < i < m$, and $2 < m \leq p$, where p represents the number of unit time, then adjusting the oil shale underground in-situ conversion heating device (29) and the formation pressure control device (30) to increase the underground in-situ conversion heating temperature and the formation pressure of oil shale;

step 4.11.6, if $r_1 \leq r_{i-1}$, where $1 < i < m$, and $2 < m \leq p$, where p represents the number of unit time, then adjusting the oil shale underground in-situ conversion heating device (29) and the formation pressure control device (30) to increase the underground in-situ conversion heating temperature and the formation pressure of oil shale, with subsequent steps as follows:

step 4.11.6.1, if $r_{i+1} > r_i$, where $1 < i < m$, and $2 < m \leq p$, where p represents the number of unit time, then adjusting the oil shale underground in-situ conversion heating device (29) and the formation pressure control device (30) to increase the underground in-situ conversion heating temperature and the formation pressure of oil shale;

step 4.11.6.2, if $r_{i+1} \leq r_i$, where $1 < i < m$, and $2 < m \leq p$, where p represents the number of units time, then maintaining the underground in-situ conversion heating temperature and the formation pressure of oil shale.

The beneficial effects of the disclosure are as follows:

1. Breathing type dust-removed gas collection can ensure stable pressure drop of gas collection flow and meanwhile reduce interference of particles to the gas-sensitive sensor, and in process of discharging gas, it may discharge the rock debris particles blocked in the sampling chamber into the dust collection box outside the chamber, effectively clean the chamber to make it clean and collect the rock debris particles, so that the multi-gas-sensitive sensor system can work effectively for a long time.

2. The gas sensor array is optimized through a data-driven manner to significantly reduce the number of sensors, thereby reducing the volume and working energy consumption of the monitoring apparatus.

3. The photoelectric fused system is used to carry out the underground in-situ exploration and thermal evolution stage monitoring of oil shale, which ensures the accuracy and real-time performance of the exploration and the thermal evolution stage monitoring, and controls the volume and cost of the overall apparatus while meeting high precision.

DESCRIPTION OF EMBODIMENTS

In order to make the purpose, technical solution and advantages of the disclosure more clear, the implementation solution of the disclosure is further described in detail in conjunction with the accompanying drawings.

Figure 1:
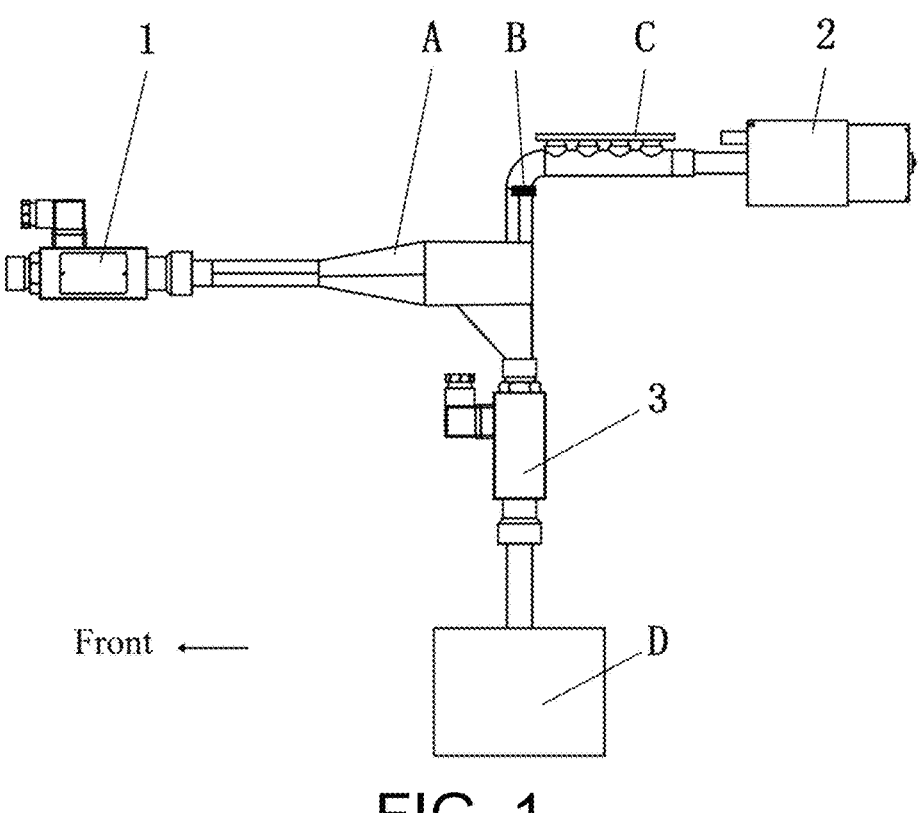
FIG. 1 is a left view of a dust-removed odor sampling device for oil shale.

As is shown in FIG. 1, the dust-removed odor sampling device 16 for oil shale includes a dustproof chamber A, a filter membrane B, a single-chip microcomputer controller C, a dust collection box D, a solenoid valve I 1, an air pump 2, and a solenoid valve II 3, where the solenoid valve I 1, the dustproof chamber A, the filter membrane B, the single-chip microcomputer controller C, the air pump 2, and the solenoid valve II 3 are arranged sequentially from front to rear; the solenoid valve I 1 is in communication with the air inlet channel 4 of the dustproof chamber A; the gas-sensitive sensor array 12 is respectively fixedly connected to the jack I a1, jack II a2, jack III a3 and jack IV a4 of the sensing channel 7 of the dustproof chamber A; the air pump 2 is in communication with the rear of the sensing channel 7 of the dustproof chamber A; the dust collection box D is connected to a lower part of the dust collection channel 8 in the dustproof chamber A through the solenoid valve II 3.

Figure 2:
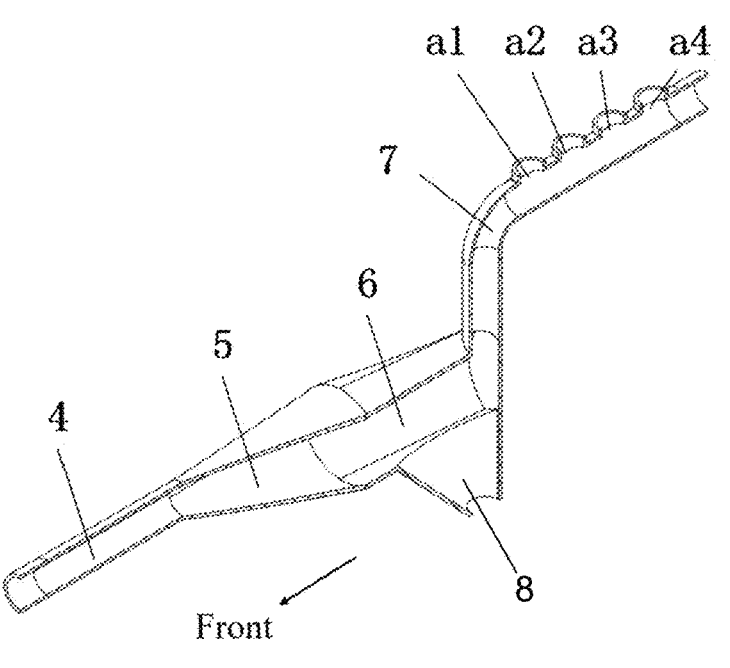
FIG. 2 is a cross-sectional view of a dustproof chamber.
Figure 3:
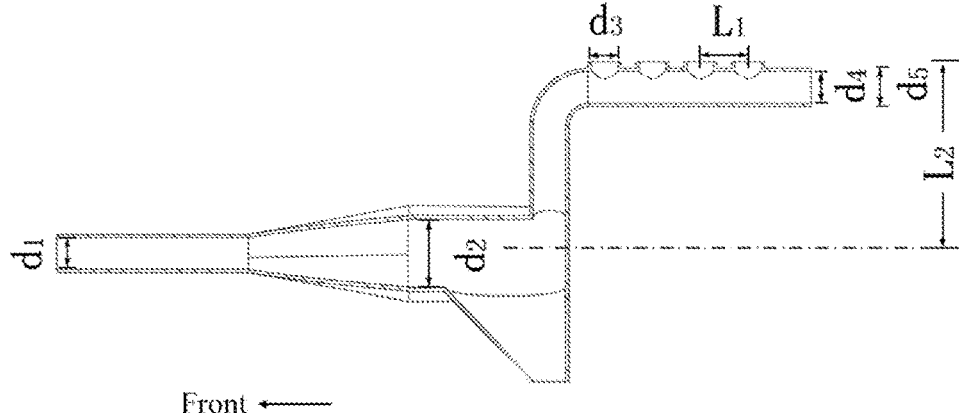
FIG. 3 is a side view of the dustproof chamber.

As shown in FIGS. 1 to 3, the dustproof chamber A is in a three-way pipe shape, and are provided with the air inlet channel 4, a diffusion channel 5, a dust settlement channel 6, the sensing channel 7 and the dust collection channel 8, an upper part of the sensing channel 7 is provided with the jack I a1, the jack II a2, the jack III a3 and the jack IV a4 of the gas-sensitive sensor array 12; the air inlet channel 4 is a circular cross-section straight pipe with an inner diameter d1=10-12 mm; the diffusion channel 5 is an inclined pipe formed by lofting a front circular cross-section and a rear circular cross-section, where centers of circles of the front and rear cross-sections are at the same horizontal line and the circles are tangent to each other, an inner diameter of the front cross-section is d1=10-12 mm, and an inner diameter of the rear cross-section is d2=28-30 mm; the dust settlement channel 6 is formed by lofting the front circular cross-section and the rear semi-circular cross-section, centers of circles of the front and rear cross-sections is concentric, and inner diameters of the front and rear cross-sections are d2=28-30 mm; the sensing channel 7 is a circular cross-section bend pipe with an inner diameter d4 of 10-12 mm and an outer diameter d5 of 12-14 mm; distances L1 between circles of the jack I a1, jack II a2, jack III a3 and jack IV a4 are 15-18 mm, inner diameters d3 are 8-9 mm, and heights L2 of all jacks in relative to center of cross-section of the air inlet channel are 60-62 mm; the dust collection channel 8 is formed by lofting an upper elliptical cross-section and a lower circular cross-section, and circles in the rear direction of the upper and lower cross-sections are tangent to each other.

Figure 4:
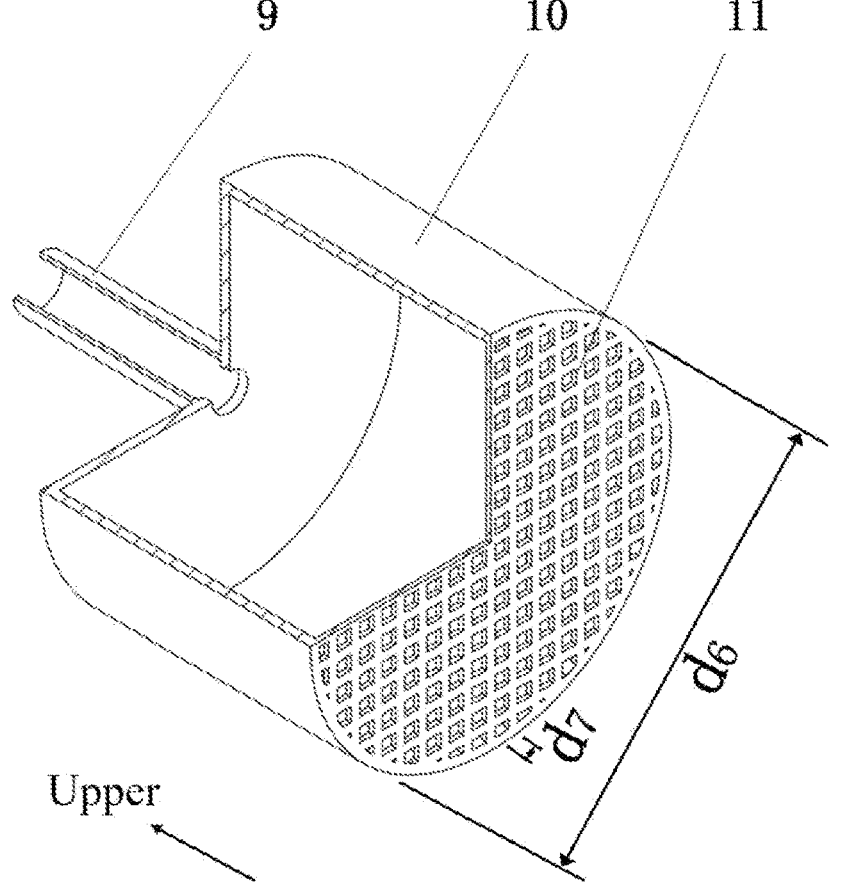
FIG. 4 is a cross-sectional view of a dust collection box.

As is shown in FIG. 4, the dust collection box D includes a dust passage pipe 9, a dust collection chamber 10, and a filter screen 11, where the dust passage pipe 9 is fixedly connected to center of an upper end of the dust collection chamber 10 and communicated therewith, and the filter screen 11 is fixedly connected to a lower end of the dust collection chamber 10; an upper end of the dust passage pipe 9 is threaded to a lower end of the dust collection channel 8, an outer diameter of the dust collection chamber 10 as cylinder is d6=40-45 mm, and a mesh diameter d7 of the filter screen 11 is 0.3-0.5 mm.

Figure 5:
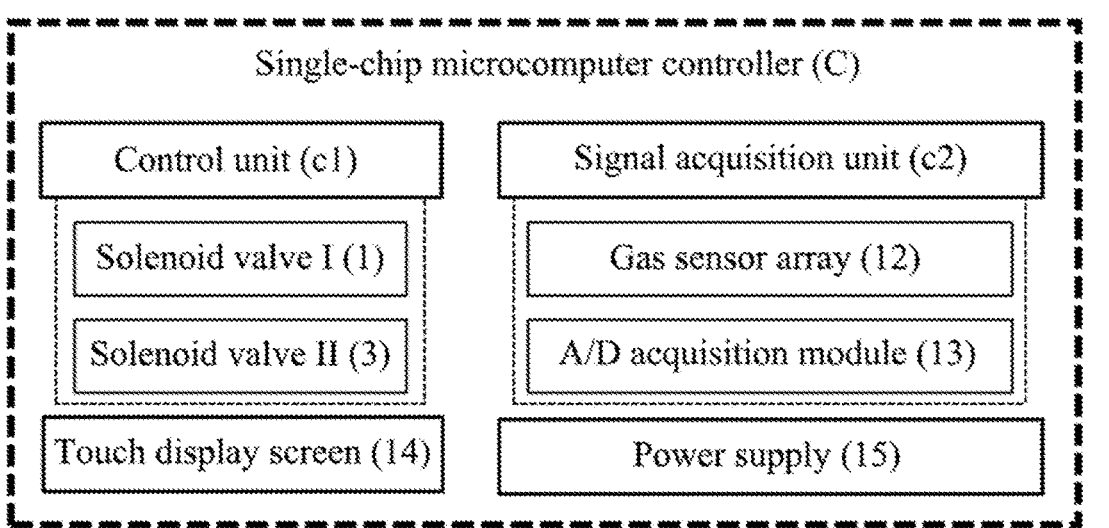
FIG. 5 is a schematic diagram of composition of a single-chip microcomputer controller.

As is shown in FIG. 5, the single-chip microcomputer controller C is connected with the solenoid valve I 1 and the solenoid valve II 3 through wires, the single-chip microcomputer controller C is connected with the gas-sensitive sensor array 12 and powered through the power supply 15, and change in voltage signal generated by the gas-sensitive sensor array is collected, recorded and stored through an A/D acquisition module 13. The single-chip microcomputer controller C includes a control unit c1, a signal acquisition unit c2, a touch display screen 14 and a power supply 15, where the control unit c1 includes a solenoid valve I 1 and a solenoid valve II 3; the signal acquisition unit c2 includes a gas-sensitive sensor array 12 and the A/D acquisition module 13; the control unit c1, the signal acquisition unit c2 and the touch display screen 14 are connected to the power supply 15 through wires.

Figure 6:
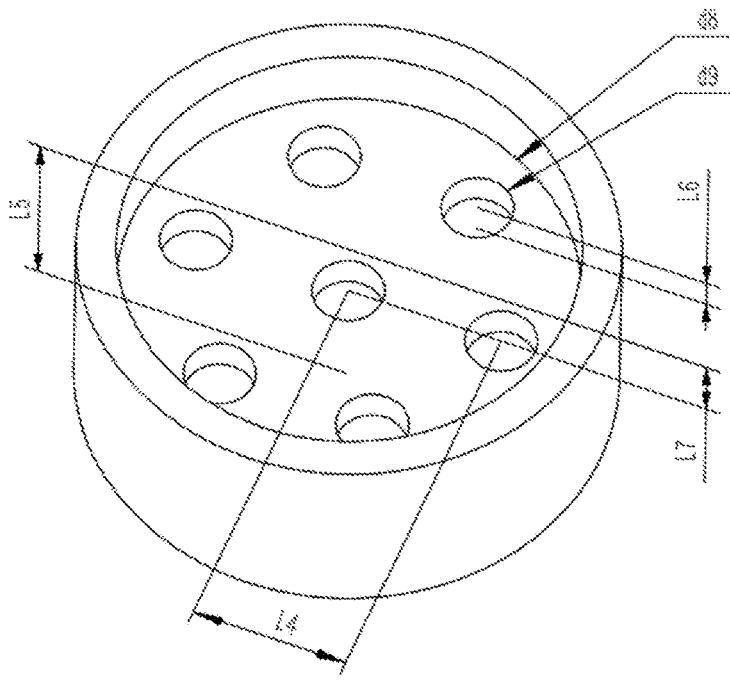
FIG. 6 is a schematic diagram of a processing template for a filter membrane.

As is shown in FIG. 6, a production method of the imitation leaf filter membrane B includes the following steps:

step S1: mixing PDMS polymer and a curing agent at a ratio of 10:1, and adding them to solvent FC-43 at 20 wt % for mechanical stirring for 10 min.

step S2: applying the solution prepared in step S1 to a pure silicon mold with a pit array, and then placing the mold in a microwave oven for radiation for 3 min.

The step S2 specifically includes: the pure silicon mold has a height of L5=25-30 mm, an inner slot thereof has a diameter of d8=10-12 mm and a height of L7=15-20 mm, and a center distance of an internally disposed cylindrical cell array is L4=15-20 μm, a depth of the cell is L6=6-8 μm, and a diameter of the cell is d9=12-16 μm.

Figure 7:
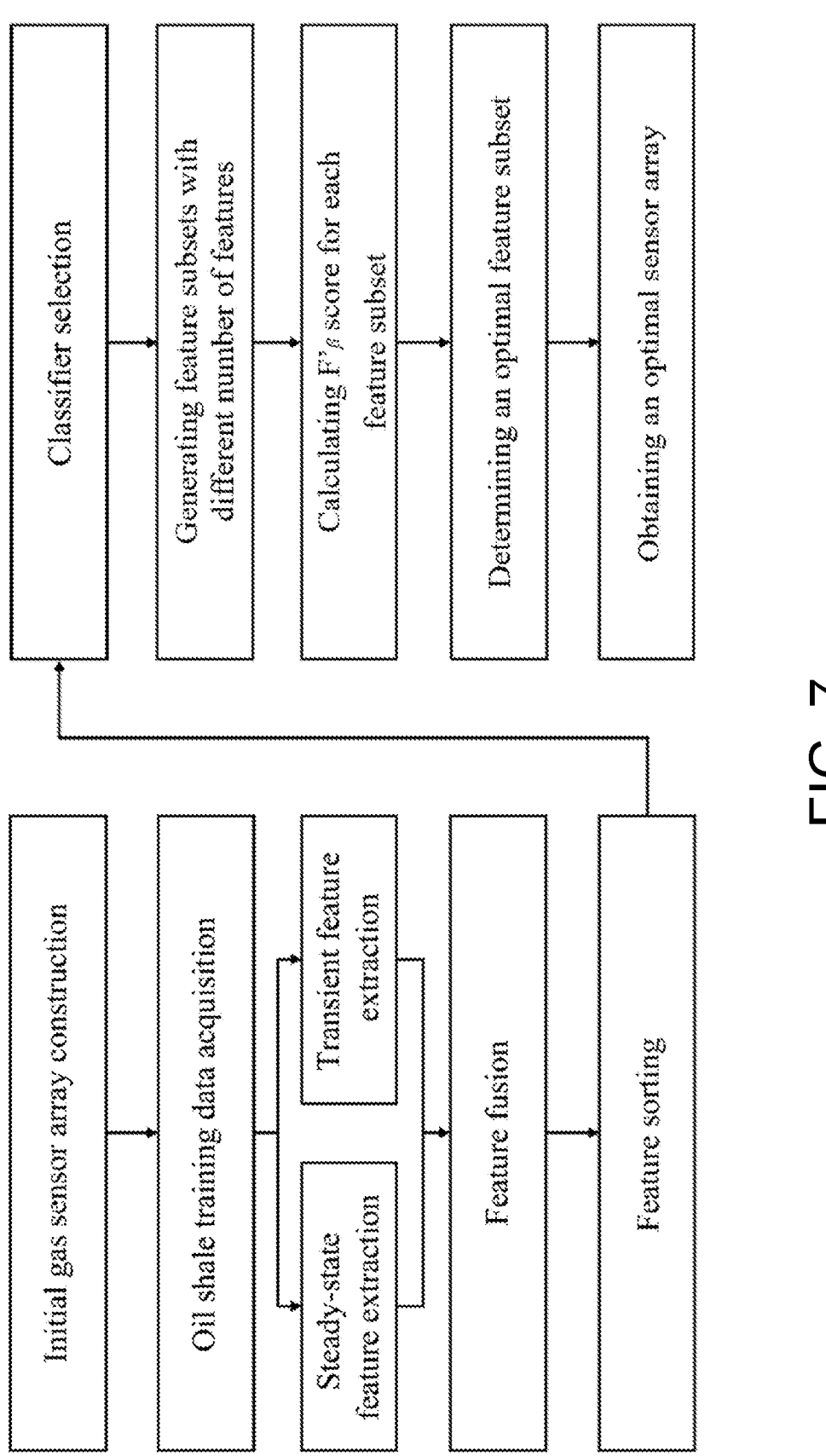
FIG. 7 is a flow chart of an efficient optimization method for an underground in-situ detection gas sensor array of oil shale.

A photoelectric fusion method for underground in-situ exploration and thermal evolution stage monitoring of oil shale, which method is described by taking recognition of oil shales with different kerogen types, abundances and maturities and thermal evolution stages as an example. The method includes the following steps:

1, According to a composition of volatile gas of oil shale and a change process of gas component concentration during the thermal evolution stage, selecting methane as a target gas of an optical gas detector 31 for underground in-situ exploration and thermal evolution stage monitoring of oil shale;

2, constructing the optical gas detector 31: a laser 16, a gas absorption pool 20, a detector 19, a laser driver 16, a signal generator 21, a lock-in amplifier 22, and a data acquisition card 23;

3, constructing an initial gas sensor array: except methane, according to type of a gas compound volatilized from oil shale in different states (different organic matter abundances, different kerogen types, different thermal evolution stages, etc.), selecting fourteen semiconductor metal oxide sensors to construct an initial gas sensor array, with initial sensor models being TGS2620, TGS2602, TGS2610, TGS2600, TGS2603, WSP1110, WSP2110, MP135, MP905, MP-7, MP-3B, MP-2, MP503, MP402;

4, obtaining, by using the initial gas sensor array constructed in step 3, oil shale odor data in different maturity states, including the following steps:

4.1, constructing a signal acquisition system by using the initial gas sensor array, together with an air pump, a filter noise reduction circuit 25 and a data acquisition instrument 24, and heating an oil shale sample according to a heat injection in-situ mining method of oil shale; converting, by the signal acquisition system, an odor into numerical data that is easy to be processed, where 480 odor samples are collected;

4.2, labeling 480 odor samples, to finally obtain 210 low-mature oil shale odor samples, 210 medium-mature oil shale odor samples and 60 over-mature oil shale odor samples were obtained in total;

5, as shown in FIG. 7, performing a feature extraction on the obtained oil shale odor samples, including the following steps:

5.1, extracting maximum values, average values and integral values of the samples to reflect steady-state feature information of the samples of oil shale;

5.2, extracting, by using wavelet transform and Fourier transform, transient feature information of the samples;

5.3, enabling the extracted maximum value features, average value features, integral value features and transient feature information of the samples extracted by using wavelet transform and Fourier transform to form a final feature vector, where feature number in the feature vector is 144;

6, sorting each feature in the feature vector based on its importance, including the following steps:

6.1, calculating the importance of each feature by using a filter method (selecting correlation coefficient method and ReliefF algorithm) in feature selection and sorting each feature, where the higher the sorting is, the more important the feature is for oil shale state detection.

6.2, calculating the importance of each feature by using an embedding method selecting XGBoost-RFE algorithm, Random Forest RFE algorithm, SVM-RFE algorithm, Logistic Regression RFE algorithm, Random Forest algorithm, CatBoost algorithm, Xgboost algorithm in feature selection and sorting each feature, where the higher the sorting is, the more important the feature is for oil shale state detection.

Figure 8:
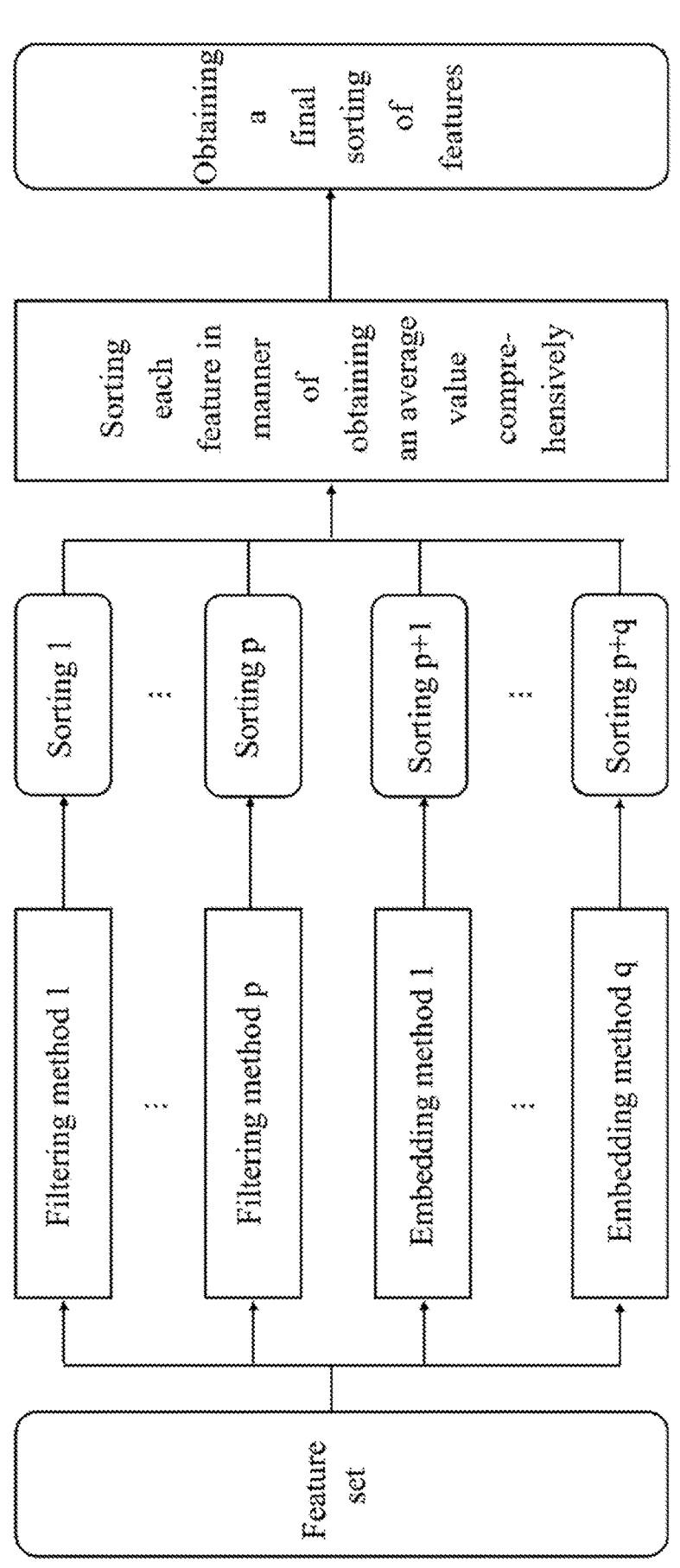
FIG. 8 is a schematic diagram of feature importance sorting.

6.3, as shown in FIG. 8, sorting each feature by obtaining an average value and combining sequence numbers obtained by multiple sorting methods to obtain a final sorting of features;

7, utilizing $$F'_\beta$$

score to achieve selection of an optimal feature subset, including the following steps:

7.1, in order to find a best classifier, using a support vector machine, a logistic regression, a random forest, a k-nearest neighbor and a limit gradient enhancement XGBoost to recognize a dataset, where through comparison, it is found that XGBoost classifier has a best recognition effect on oil shale with different maturities, and thus XGBoost is chosen as a mode recognition classifier;

7.2, generating different number of feature subsets based on sorting of the features, and evaluating each feature subset by using an improved $F_\beta$ score, $$F'_\beta = \left(1 + \beta^2\right) \times \frac{\frac{d-m}{d-1} \times \text{accuracy}}{\left(\beta^2 \times \frac{d-m}{d-1}\right) + \text{accuracy}},$$

where after data testing on $\beta=1, 2, \ldots, 10$, it is found that when $\beta=7$, the best effect can be obtained, so it is finally determined that the $$F'_7$$

score is used as a selection criterion of the optimal feature subset.

8, finding gas sensors corresponding to features in the optimal feature subset, to jointly form an optimized sensor array; and performing a 10-fold cross-validation on the collected data, where an average value of finally obtained 10 results is shown in Table 1, compared with original data, the feature number is reduced by 83.33%, the sensors number is reduced by 50%, and the recognition rate is increased by 5.61%, the recognition time is reduced by 25.39%.

TABLE 1

| | | | | | | | |
|---|---|---|---|---|---|---|---|
| Comparison before and after sensor array optimization | | | | | | | |
| File: 140623usf | | | | | | | |
| | Sensor number | Feature number | Accuracy (%) | Precision (%) | F₁'score (%) | F₇'score (%) | Recognition time (s) |
| Initial sensor array | 16 | 144 | 89.79 | 88.29 | 87.45 | — | 1.3617 |
| Optimized sensor array | 8 +/− 1 | 24 +/− 5 | 93.65 | 93.90 | 93.58 | 93.42 | 1.0160 |

Figure 9:
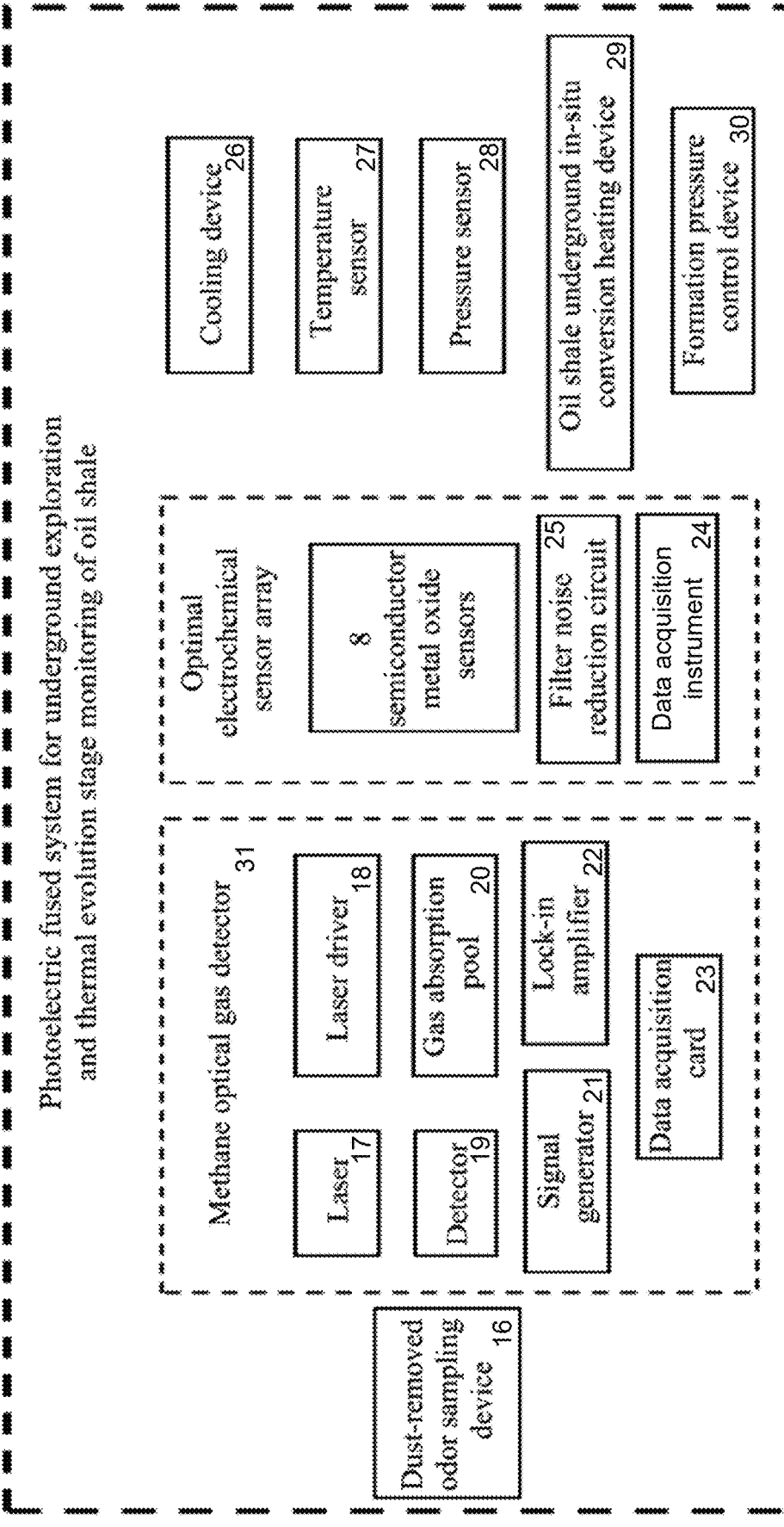
FIG. 9 is a schematic diagram of composition of a photoelectric fused system for underground in-situ exploration and thermal evolution stage monitoring of oil shale.
Figure 10:
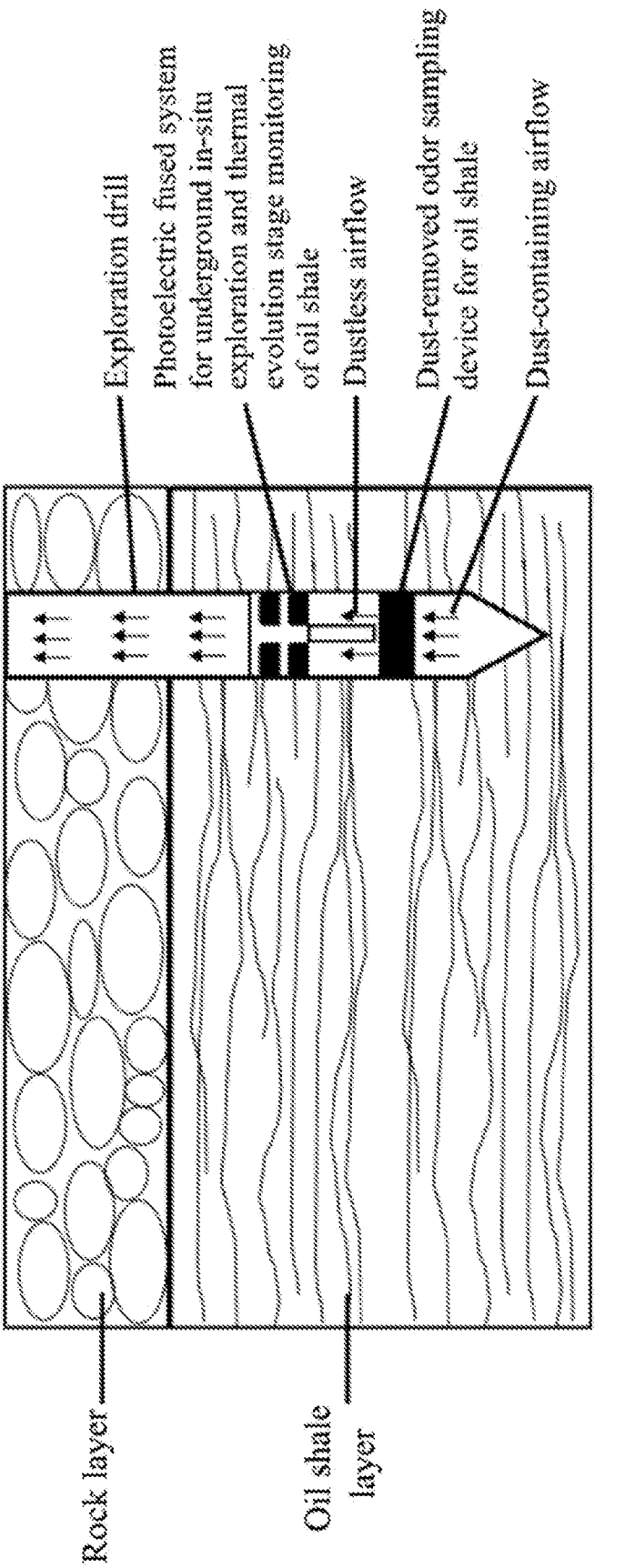
FIG. 10 is a schematic diagram of underground in-situ exploration of oil shale.

9, as shown in FIG. 9, establishing a photoelectric fused system for underground in-situ exploration and thermal evolution stage monitoring of oil shale: a miniaturized sensor array obtained after optimizing the sensor array (sensor models are TGS2602, WSP2110, MP135, MP905, MP-7, MP-3B, MP503, MP402), a methane optical gas detector 31, a cooling device 26, a temperature sensor 27, pressure sensor 28, an oil shale underground in-situ conversion heating device 29, and a formation pressure control device 30;

10, as is shown in FIG. 10, using the photoelectric fused system for underground in-situ exploration and thermal evolution stage monitoring of oil shale to realize underground in-situ exploration of oil shale, including the following steps:

10.1, accurately measuring oil shales with different kerogen types (kerogen types I, II, and III) in laboratory to obtain their kerogen types as labels, and meanwhile, heating the oil shale samples, and converting, by using the photoelectric fused system for underground in-situ exploration and thermal evolution stage monitoring of oil shale, multi-component gas odor information into numerical data that is easy to be processed, where a signal acquisition frequency is 5 Hz, and the numerical data collected each time includes 8 response data of eight semiconductor metal oxide sensors optimized by the gas sensor array, and a methane gas concentration value obtained by a methane optical gas detector 31 through inversion of Lambert-Beer law, five data collected every 10 seconds constitute a to-be-tested sample, and each to-be-tested sample with different kerogen types contains $5 \times 9 \times 10 = 450$ data points, the kerogen type labels together with the numerical data converted by the photoelectric fused system constitute a training set;

10.2, extracting, by using a maximum-value feature extraction method, steady-state features of the to-be-tested samples, to constitute a maximum-value feature set of the to-be-tested samples, where each sample contains 9 data points;

10.3, using XGBoost mode recognition method and taking the maximum-value feature set of the samples to be tested as input to construct a classification model for determining organic matter kerogen type of oil shale;

10.4, measuring accurately oil shales with different abundances in laboratory to obtain their abundances as labels, and meanwhile, heating the oil shale samples, and converting, by using the photoelectric fused system for underground in-situ exploration and thermal evolution stage monitoring of oil shale, multi-component gas odor information into numerical data that is easy to be processed, where a signal acquisition frequency is 5 Hz, and the numerical data collected each time includes 8 response data of eight semiconductor metal oxide sensors optimized by the gas sensor array and a methane gas concentration value obtained by a methane optical gas detector 31 through inversion of Lambert-Beer law, five data collected every 10 seconds constitute a to-be-tested sample, and each to-be-tested sample with different abundances contains $5 \times 9 \times 10 = 450$ data points, the oil shale abundance labels together with the numerical data converted by the photoelectric fused system constitute a training set;

10.5, extracting, by using the maximum-value feature extraction method, steady-state features of the to-betested samples, to constitute a maximum-value feature set of the to-be-tested samples, where each sample contains 9 data points;

10.6, constructing, by using a random forest regression analysis method and taking the maximum-value feature set of the to-be-tested samples as input, a prediction model for determining organic matter abundance of oil shale;

10.7, measuring accurately oil shales with different maturity stages (three stages, dehydration, organic matter decomposition and semi-coke mineral decomposition) in laboratory to obtain their maturity stages and maturity values as labels, and meanwhile, heating the oil shale samples, and converting, by using the photoelectric fused system for underground in-situ exploration and thermal evolution stage monitoring of oil shale, multi-component gas odor information into numerical data that is easy to be processed, where a signal acquisition frequency is 5 Hz, and the numerical data collected each time includes 8 response data of eight semiconductor metal oxide sensors optimized by the gas sensor array and a methane gas concentration value obtained by a methane optical gas detector 31 through inversion of Lambert-Beer law, five data collected every 10 seconds constitute a to-be-tested sample, and each to-be-tested sample with different kerogen types contains $5 \times 9 \times 10 = 450$ data points, the maturity stage labels together with the numerical data converted by the photoelectric fused system constitute a training set, and the maturity value labels together with the numerical data converted by the photoelectric fused system constitute a maturity value training set;

10.8, extracting, by using a maximum-value feature extraction method, steady-state features of the maturity stage training set, to constitute a maturity stage maximum-value feature set, where each sample contains 9 data points;

10.9, constructing, by using a convolutional neural network mode recognition method and taking the maturity stage maximum-value feature set as input, a classification model for determining the organic matter maturity stage of oil shale;

10.10, extracting, by using a maximum-value feature extraction method, steady-state features of the maturity value training set, to constitute a maturity value maximum-value feature set, where each sample contains 9 data points;

10.11, constructing, by using a support vector machine regression analysis method and taking the maturity value maximum-value feature set as input, a prediction model for determining the organic matter maturity of oil shale;

10.12, heating the oil shale that is undergoing underground in-situ exploration, and converting, by using the photoelectric fused system for underground in-situ exploration and thermal evolution stage monitoring of oil shale, an odor into numerical data that is easy to be processed;

10.13, extracting, by using a maximum-value feature extraction method, features of the numerical data of volatile gas of oil shale that is undergoing underground in-situ exploration as obtained in 10.12;

10.14, determining, by using the XGBoost classification mode of the organic matter kerogen type of oil shale as constructed in 10.3 and taking the feature obtained in 10.13 as input, the organic matter kerogen type of oil shale belongs to which one of kerogen types I, II and III;

10.15, determining, by using the prediction model for determining the organic matter abundance of oil shale as constructed in 10.6 and taking the feature obtained in 10.13 as input, the organic matter abundance of oil shale.

Figure 11:
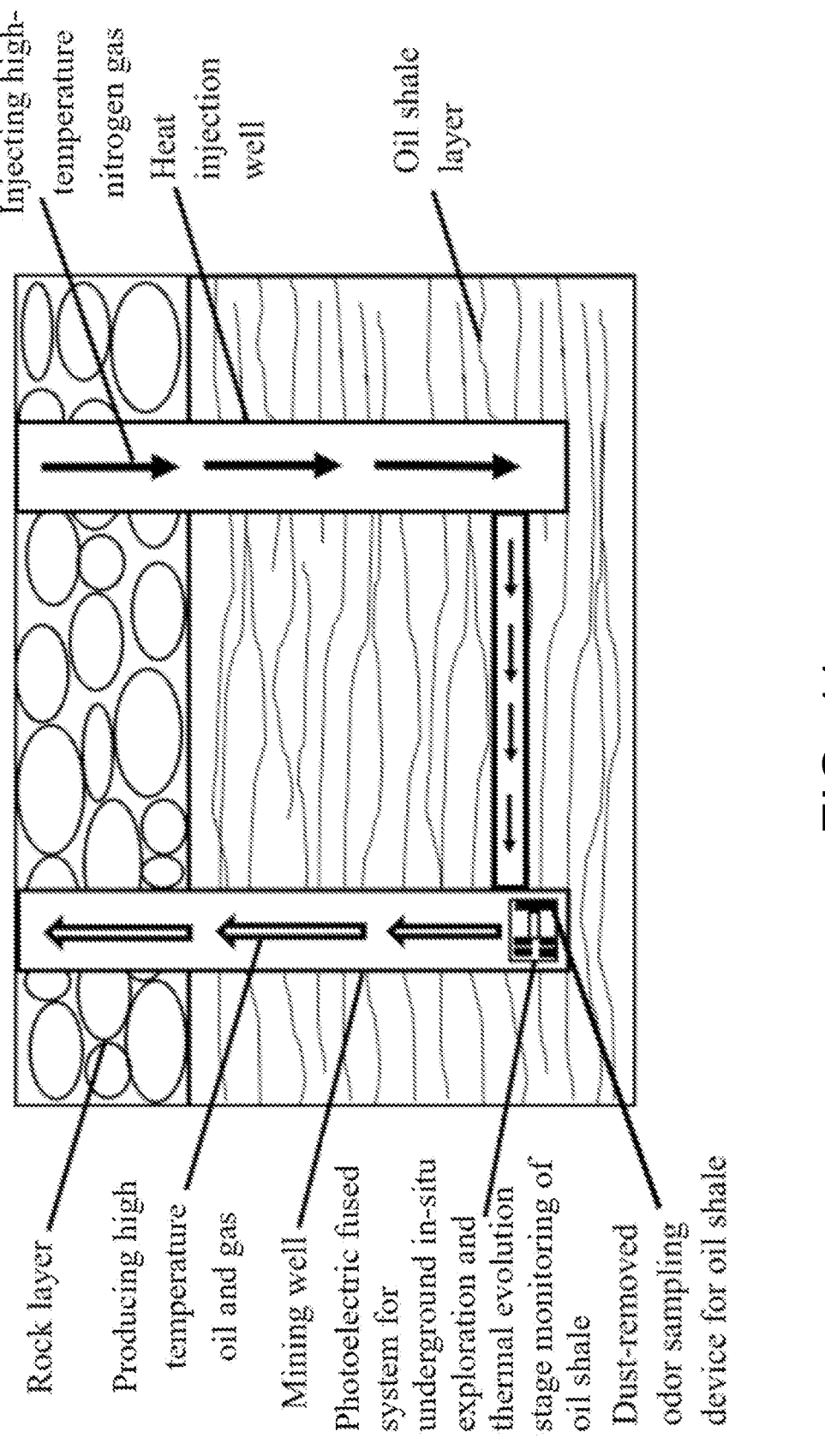
FIG. 11 is a schematic diagram of photoelectric fused thermal evolution stage monitoring of oil shale.
Figure 12:
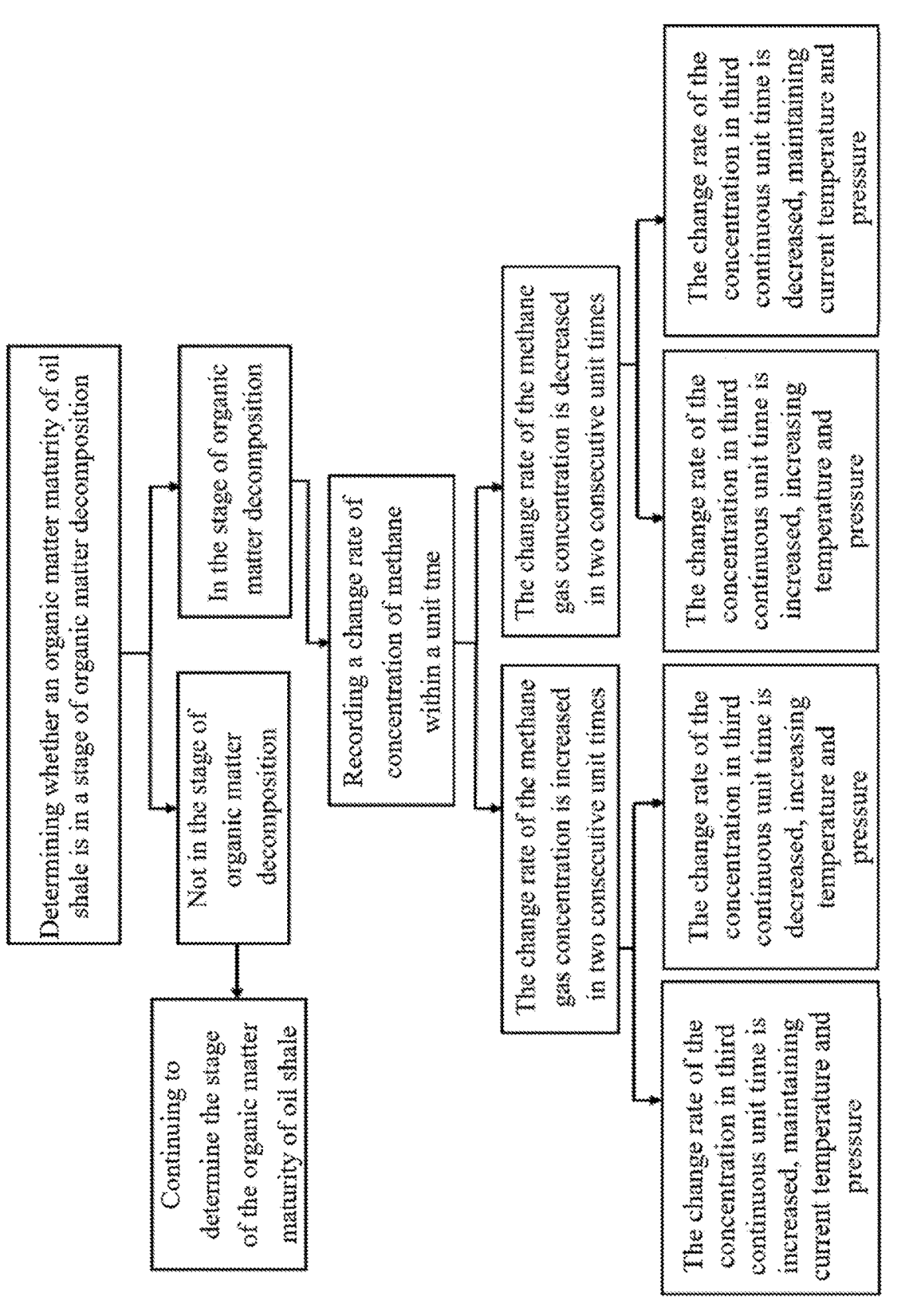
FIG. 12 is a flow chart of temperature and pressure regulation in in-situ mining of oil shale.

10.16, determining, by using the classification model of the organic matter maturity stage of oil shale as constructed in 10.9 and taking the feature obtained in 10.13 as input, organic matter maturity of oil shale is in which stage among three stages, dehydration, organic matter decomposition and semi-coke mineral decomposition;

10.17, determining, by using the support vector machine prediction model of the organic matter maturity of oil shale as constructed in 10.11 and taking the feature obtained in 10.13 as input, the organic matter maturity of oil shale;

10.18, according to the kerogen type, abundance, organic matter maturity stage and organic matter maturity value of oil shale as obtained in 10.14, 10.15, 10.16 and 10.17, evaluating accurately the mineral value of oil shale, guiding the selection of on-site conversion technology and engineering process design, to assist efficient in-situ exploitation of underground oil and gas resources;

11, as shown in FIG. 11, using the photoelectric fused system for underground in-situ exploration and thermal evolution stage monitoring of oil shale to realize the underground in-situ thermal evolution stage monitoring of oil shale, including the following steps:

11.1, heating the oil shale that is undergoing underground in-situ exploration, and converting, by using the photoelectric fused system for underground in-situ exploration and thermal evolution stage monitoring of oil shale, the odor into numerical data that is easy to be processed;

11.2, extracting, by using a maximum-value feature extraction method, extract features of the numerical data of volatile gas of oil shale that is undergoing underground in-situ exploration, as obtained in 11.1;

11.3, determining, by using the classification model of the organic matter maturity stage of oil shale constructed in 10.9 and taking the feature obtained in 10.13 as input, the organic matter maturity of oil shale is in which stage among three stages, i.e., dehydration, organic matter decomposition and semi-coke mineral decomposition;

11.4, as shown in FIG. 12, if the organic matter maturity of oil shale determined in 11.3 is in the stage of organic matter decomposition, then separately analyzing a concentration signal of methane gas obtained by the optical gas detector 31 in the photoelectric fused system for underground in-situ exploration and thermal evolution stage monitoring of oil shale, where 100 s is taken as unit time and an average value of methane gas concentration within each unit time is taken as a gas concentration represented by the unit time; and meanwhile, recording a change rate of the methane gas concentration within each unit time.

11.5, if the change rate of the methane gas concentration is increased in two consecutive unit times, then adjusting the oil shale underground in-situ conversion heating device 29 and formation pressure control device 30 to increase the oil shale underground in-situ conversion heating temperature and formation pressure, with subsequent steps as follows:

11.5.1, if the change rate of the methane gas concentration in next continuous unit time continues to be increased, then maintaining the oil shale underground in-situ conversion heating temperature and the formation pressure;

11.5.2, if the change rate of the methane gas concentration in next continuous unit time is decreased, then adjusting the oil shale underground in-situ conversion heating device 29 and the formation pressure control device 30 to increase the oil shale underground in-situ conversion heating temperature and formation pressure;

11.6, if the change rate of the methane gas concentration is decreased in two consecutive unit times, then adjusting the oil shale underground in-situ conversion heating device 29 and formation pressure control device 30 to increase the oil shale underground in-situ conversion heating temperature and formation pressure, with subsequent steps are as follows:

11.6.1, if the change rate of the methane gas concentration in next continuous unit time is increased, then adjusting the oil shale underground in-situ conversion heating device 29 and formation pressure control device 30 to increase the oil shale underground in-situ conversion heating temperature and formation pressure;

11.6.2, if the change rate of the methane gas concentration in next continuous unit time is decreased, then maintaining the oil shale underground in-situ conversion heating temperature and formation pressure.

What is claimed is:

1. A dust-removed odor sampling device for oil shale, comprising a dustproof chamber, a filter membrane, a single-chip microcomputer controller, a dust collection box, a solenoid valve I, an air pump, and a solenoid valve II, where the solenoid valve I, the dustproof chamber, the filter membrane, the single-chip microcomputer controller, the air pump, and the solenoid valve II are arranged sequentially from front to rear;

the dustproof chamber is a three-way pipe, on which an air inlet channel, a diffusion channel, a dust settlement channel, a sensing channel and a dust collection channel are provided, an upper part of the sensing channel is provided with a jack I, a jack II, a jack III and a jack IV of a gas-sensitive sensor array; the air inlet channel is a circular cross-section straight pipe with an inner diameter $d1=10-12$ mm; the diffusion channel is an inclined pipe formed by lofting a front circular cross-section and a rear circular cross-section, where centers of circles of the front and rear cross-sections are at a same horizontal line and the circles are tangent to each other, an inner diameter of the front cross-section is $d1=10-12$ mm, and an inner diameter of the rear cross-section is $d2=28-30$ mm;

the dust settlement channel is formed by lofting a front circular cross-section and a rear semi-circular cross-section, centers of circles of the front and rear cross-sections are concentric, and inner diameters of the front and rear cross-sections are $d2=28-30$ mm; the sensing channel is a circular cross-section bend pipe with an inner diameter $d4=10-12$ mm and an outer diameter $d5=12-14$ mm; distances between centers of circles of the jack I, jack II, jack III and jack IV are $L1=15-18$ mm, inner diameters of the jacks are $d3=8-9$ mm, and heights of all jacks in relative to height of center of cross-section of the air inlet channel are $L2=60-62$ mm;

the dust collection channel is formed by lofting an upper elliptical cross-section and a lower circular cross-section, and circles of the upper and lower cross-sections are tangent to each other in their rear directions;

the single-chip microcomputer controller comprises a control unit, a signal acquisition unit, a touch display screen, and a power supply, where the control unit comprises the solenoid valve I and the solenoid valve II; the signal acquisition unit comprises the gas-sensitive sensor array and an analog-to-digital acquisition module; the control unit, the signal acquisition unit, and the touch display screen are connected to the power supply through wires;

the dust collection box comprises a dust passage pipe, a dust collection chamber, and a filter screen, where the dust passage pipe is fixedly connected to and communicated with a center of an upper end of the dust collection chamber, and the filter screen is fixedly connected to a lower end of the dust collection chamber; an upper end of the dust passage pipe is threaded to a lower end of the dust collection channel, an outer diameter of the dust collection chamber, being a cylinder, is d6=40-45 mm, and a diameter of mesh of the filter screen is d7=0.3-0.5 mm;

the solenoid valve I is communicated with the air inlet channel of the dustproof chamber; the gas-sensitive sensor array is fixedly connected to the jack I, jack II, jack III and jack IV respectively of the sensing channel of the dustproof chamber;

the air pump is communicated with a rear part of the sensing channel of the dustproof chamber;

the dust collection box is communicated with a lower part of the dust collection channel in the dustproof chamber through the solenoid valve II;

the single-chip microcomputer controller is connected with the solenoid valve I and the solenoid valve II through wires, the single-chip microcomputer controller is connected with the gas-sensitive sensor array and powered through the power supply, and a voltage signal transformation generated by the gas-sensitive sensor array is collected, recorded and stored through the analog-to-digital acquisition module;

wherein the filter membrane is located at an entrance of the sensing channel and is used to intercept particles in the dust settlement channel from entering the sensing channel, thereby ensuring that the gas-sensitive sensor array is not affected by fine particles and achieving dust-proof sampling.

2. The dust-removed odor sampling device for oil shale according to claim 1, wherein the dustproof chamber is a three-way pipe, on which an air inlet channel, a diffusion channel, a dust settlement channel, a sensing channel and a dust collection channel are provided, an upper part of the sensing channel is provided with a jack I, a jack II, a jack III and a jack IV of a gas-sensitive sensor array; the air inlet channel is a circular cross-section straight pipe with an inner diameter d1=10-12 mm; the diffusion channel is an inclined pipe formed by lofting a front circular cross-section and a rear circular cross-section, where centers of circles of the front and rear cross-sections are at a same horizontal line and the circles are tangent to each other, an inner diameter of the front cross-section is d1=10-12 mm, and an inner diameter of the rear cross-section is d2=28-30 mm;

the dust settlement channel is formed by lofting a front circular cross-section and a rear semi-circular cross-section, centers of circles of the front and rear cross-sections are concentric, and inner diameters of the front and rear cross-sections are d2=28-30 mm; the sensing channel is a circular cross-section bend pipe with an inner diameter d4=10-12 mm and an outer diameter d5=12-14 mm; distances between centers of circles of the jack I, jack II, jack III and jack IV are L1=15-18 mm, inner diameters of the jacks are d3=8-9 mm, and heights of all jacks in relative to height of center of cross-section of the air inlet channel are L2=60-62 mm; the dust collection channel is formed by lofting an upper elliptical cross-section and a lower circular cross-section, and circles of the upper and lower cross-sections are tangent to each other in their rear directions;

the dust collection box comprises a dust passage pipe, a dust collection chamber, and a filter screen, where the dust passage pipe is fixedly connected to and communicated with a center of an upper end of the dust collection chamber, and the filter screen is fixedly connected to a lower end of the dust collection chamber; an upper end of the dust passage pipe is threaded to a lower end of the dust collection channel, an outer diameter of the dust collection chamber, being a cylinder is d6=40-45 mm, and a diameter of mesh of the filter screen is d7=0.3-0.5 mm.

3. A production method of filter membrane, comprising the following steps:

S1: mixing a PDMS polymer and a curing agent at a ratio of 10:1, and adding them to solvent FC-43 at 20 wt % for mechanical stirring for 10 min, S2: applying solution prepared in step S1 to a pure silicon mold with a pit array, and then placing the mold into a microwave oven for 3 min of radiation, wherein the pure silicon mold has a height of L5=25-30 mm, an inner slot thereof has a diameter of d8=10-12 mm and a height of L7=15-20 mm, and distances between centers of cells of a cylindrical cell array arranged in the inner slot are L4=15-20 μm, depths of the cells are L6=6-8 μm and diameters of the cells are d9=12-16 μm.

4. A photoelectric fusion method for underground in-situ exploration and thermal evolution stage monitoring of oil shale, wherein the method is based on the dust-removed odor sampling device for oil shale according to claim 1, and specifically comprises the following steps:

4.1, according to composition of a volatile gas of oil shale and a change process of a concentration of a gas component during thermal evolution stage, taking a gas whose concentration changes significantly with decomposition of organic matter of oil shale as a target gas of an optical gas detector, and recording the target gas as G;

4.2, constructing the optical gas detector, which comprises: a laser, a gas absorption pool, a detector, a laser driver, a signal generator, a lock-in amplifier, and a data acquisition card;

4.3, constructing an initial gas sensor array: according to type of a gas compound volatilized from oil shale in different states, selecting other gas sensor except the target gas G in step 4.1, to construct an initial gas senor array that is capable of monitoring all heat volatile gases, where the different states of oil shale comprise organic matter abundance, kerogen type and thermal evolution stage;

4.4, obtaining, by using the initial gas sensor array constructed in step 4.3, oil shale odor data in different maturity states, comprising the following steps:

4.4.1, constructing a signal acquisition system by using the initial gas sensor array, together with an air pump, a filter noise reduction circuit and a data acquisition instrument, and heating oil shale sample according to a heat-injection in-situ mining method of oil shale; converting, by the signal acquisition system, an odor into numerical data, where n odor samples are collected and recorded as set $S=\{s_1, s_2, s_3, \ldots, s_n\}$;

4.4.2, obtaining the thermal evolution stage of oil shale through a laboratory measurement, recording it as set $L=\{l_1, l_2, \ldots, l_k\}$, and corresponding it to the odor samples to form a training set $$T = \{s_1^l, s_2^l, s_3^l, \ldots, s_n^l\},$$

where $l \in L$;

4.5, extracting and fusing multi-phase features of the training set of oil shale, comprising the following steps:

4.5.1, extracting, by a plurality of steady-state feature extraction methods, a steady-state feature of each sample to form a steady-state feature vector, which is recorded as $F_s$;

4.5.2, extracting, by a plurality of transient feature extraction methods, a transient feature of each sample to form a transient feature vector, which is recorded as $F_t$;

4.5.3, fusing the steady-state feature vector and the transient feature vector extracted from each sample to form a final feature vector $F=(F_s, F_t)$;

4.6, sorting each feature in the final feature vector based on its importance, comprising the following steps:

4.6.1, calculating the importance of each feature by using a filtering method in feature selection and sorting each feature;

4.6.2, calculating the importance of each feature by using an embedding method in feature selection and sorting each feature;

4.6.3, sorting each feature by obtaining an average value and combining sequence numbers obtained by multiple sorting methods to obtain a final sorting of features;

4.7, utilizing $$F_\beta'$$

score to achieve selection of an optimal feature subset, comprising the following steps:

4.7.1, recognizing, by using numerous classifiers in machine learning, a state of oil shale on the training set, comparing a recognition results of each classifier with a true state of the oil shale, and determining the classifier with a smallest difference between the recognition result and the true state of the oil shale as a classifier with best recognition effect and use it as a feature subset selection classifier, where a 10-fold cross-validation is used for evaluation in an evaluation process of the classifiers;

4.7.2, generating different number of feature subsets based on sorting of the features, evaluating each feature subset by an improved $F_\beta$ score, $$F_\beta' = (1 + \beta^2) \times \frac{\frac{d-m}{d-1} \times \text{accuracy}}{\left(\beta^2 \times \frac{d-m}{d-1}\right) + \text{accuracy}},$$

and determining a feature subset with a highest $$F_\beta'$$

score as the optimal feature subset, where d is feature number in the final feature vector F, m is feature number in the feature subset, accuracy is a recognition rate of an established model for state prediction of oil shale, and $\beta$ is integer in [1,10], which is selected through data testing;

4.8, finding gas sensors corresponding to features in the optimal feature subset, to jointly form an optimized sensor array;

4.9, establishing a photoelectric fused system for underground in-situ exploration and thermal evolution stage monitoring of oil shale: the optimized sensor array obtained after optimizing the sensor array, together with the optical gas detector, a cooling device, a temperature sensor, a pressure sensor, an oil shale underground in-situ conversion heating device, and a formation pressure control device constitute the photoelectric fused system for underground in-situ exploration and thermal evolution stage monitoring of oil shale;

4.10, using the photoelectric fused system for underground in-situ exploration and thermal evolution stage monitoring of oil shale to realize underground in-situ exploration of oil shale, comprising the following steps:

4.10.1, for oil shales with different kerogen types, measuring their kerogen types in laboratory, to constitute a label set, which is recorded as set $$G_1 = \{g_1^1, g_2^1, g_3^1, \ldots, g_k^1\},$$

and meanwhile, collecting, by using the photoelectric fused system for underground in-situ exploration and thermal evolution stage monitoring of oil shale, volatile gas information of oil shale, which is recorded as set $$H_1 = \{h_1^1, h_2^1, h_3^1, \ldots, h_k^1\},$$

and combining $G_1$ and $H_1$ to constitute a training set $$J_1 = \left\{ f_{h_1^1}^g, f_{h_2^1}^g, f_{h_3^1}^g, \ldots, f_{h_k^1}^g \right\},$$

where $g \in G_1$;

4.10.2, extracting features of the set $J_1$ using a feature extraction method to constitute a feature set, which is recorded as $$F_j^1;$$

4.10.3, constructing, by using a machine learning algorithm and taking the feature $$F_j^1$$

as input, a classification model, which is recorded as $A_1$, for determining type of organic matter kerogen of oil shale;

4.10.4, for oil shales with different abundances, measuring their abundances in laboratory, to constitute a label set, which is recorded as set $$G_2 = \{g_1^2, g_2^2, g_3^2, \dots, g_k^2\},$$

and meanwhile, collecting, by using the photoelectric fused system for underground in-situ exploration and thermal evolution stage monitoring of oil shale, volatile gas information of oil shale, which is recorded as set $$H_2 = \{h_1^2, h_2^2, h_3^2, \dots, h_k^2\},$$

and combining $G_2$ and $H_2$ to constitute a training set, $$J_2 = \left\{ f_{h_1^2}^g, f_{h_2^2}^g, f_{h_3^2}^g, \dots, f_{h_k^2}^g \right\},$$

where $g \in G_2$;

4.10.5, extracting features of the set $J_2$ using a feature extraction method to constitute a feature set, which is recorded as $$F_j^2;$$

4.10.6, constructing, by using a regression analysis method and taking the feature $$F_j^2$$

as input, a prediction model, which is recorded as $A_2$, for determining abundance of organic matter of oil shale;

4.10.7, for oil shales with different maturities, measuring their maturity stages and maturity values in laboratory, where the maturity stages constitute a label set, which is recorded as set $$G_3 = \{g_1^3, g_2^3, g_3^3, \dots, g_k^3\},$$

the maturity values constitute a label set, which is recorded as set $$G_4 = \{g_1^4, g_2^4, g_3^4, \dots, g_k^4\},$$

and meanwhile, collecting, by using the photoelectric fused system for underground in-situ exploration and thermal evolution stage monitoring of oil shale, volatile gas information of oil shale, which is recorded as set $$H_3 = \{h_1^3, h_2^3, h_3^3, \dots, h_k^3\},$$

combining $G_3$ and $H_3$ to constitute a training set, $$J_3 = \left\{ f_{h_1^3}^g, f_{h_2^3}^g, f_{h_3^3}^g, \dots, f_{h_k^3}^g \right\},$$

where $g \in G_3$; and combining $G_4$ and $H_3$ to constitute a training set $$J_4 = \left\{ f_{h_1^3}^g, f_{h_2^3}^g, f_{h_3^3}^g, \dots, f_{h_k^3}^g \right\},$$

where $g \in G_4$;

4.10.8, extracting features of the set $J_3$ using a feature extraction method to constitute a feature set, which is recorded as $$F_j^3;$$

4.10.9, constructing, by using a machine learning algorithm and taking the feature $$F_j^3$$

as input, a classification model, which is recorded as $A_3$, for determining maturity stage of organic matter of oil shale;

4.10.10, extracting features of the set $J_4$ using a feature extraction method to constitute a feature set, which is recorded as $$F_j^4;$$

4.10.11, constructing, by using a regression analysis method and taking the feature $$F_j^4$$

as input, a prediction model, which is recorded as $A_4$, for determining maturity of organic matter of oil shale;

4.10.12, heating an oil shale undergoing underground in-situ exploration, and converting, by using the photoelectric fused system for underground in-situ exploration and thermal evolution stage monitoring of oil shale, odor into numerical data, which is recorded as sample x;

4.10.13, extracting a feature of a sample x using a feature extraction method and recording it as $F_x$;

4.10.14, determining, by using the classification model $A_1$ of the type of organic matter kerogen of oil shale as constructed in step 4.10.3 and taking the feature $F_x$ as input, the type of organic matter kerogen of oil shale belongs to which one of kerogen types I, II and III;

4.10.15, determining, by using the prediction model $A_2$ of the abundance of organic matter of oil shale as constructed in step 4.10.6 and taking the feature $F_x$ as input, the abundance of organic matter of oil shale;

4.10.16, determining, by using the classification model $A_3$ of the maturity stage of organic matter of oil shale as constructed in step 4.10.9 and taking the feature $F_x$ as input, the maturity of organic matter of oil shale is in which stage of three stages comprising dehydration, organic matter decomposition and semi-coke mineral decomposition;

4.10.17, determining, by using the prediction model $A_4$ of the maturity of organic matter of oil shale as constructed in step 4.10.11 and taking the feature $F_x$ as input, the maturity of organic matter of oil shale;

4.10.18, according to the kerogen type, abundance, maturity stage and maturity value of organic matter of oil shale obtained in steps 4.10.14 to 4.10.17, evaluating mineral value of oil shale and guiding on-site conversion technology selection and engineering process design to assist efficient in-situ exploitation of underground oil and gas resources;

4.11, using the photoelectric fused system for underground in-situ exploration and thermal evolution stage monitoring of oil shale to realize underground in-situ thermal evolution stage monitoring of oil shale, comprising the following steps:

4.11.1, monitoring a pyrolysis process of oil shale undergoing underground in-situ conversion, and converting, by using the photoelectric fused system for underground in-situ exploration and thermal evolution stage monitoring of oil shale, odor information into numerical data, which is recorded as sample w;

4.11.2, extracting a feature of a sample w using a feature extraction method and recording it as $F_w$;

4.11.3, determining, by using the classification model $A_3$ of maturity stage of organic matter of oil shale as constructed in step 4.10.9 and taking the feature $F_w$ as input, maturity of organic matter of oil shale is in which stage of three stages comprising dehydration, organic matter decomposition and semi-coke mineral decomposition;

4.11.4, in the case that the maturity of organic matter of oil shale as determined in step 4.11.3 is in stage of the organic matter decomposition, then separately analyzing a gas concentration signal of the target gas G obtained by a mid-infrared laser gas sensing system in the photoelectric fused system for underground in-situ exploration and thermal evolution stage monitoring of oil shale, where an unit time is recorded as o, a set constituted by p unit times is recorded as $O=\{o_1, o_2, o_3, \ldots, o_p\}$, an average concentration of the target gas G in each unit time o is used as a representative gas concentration in this unit time and its set is recorded as $C=\{c_1, c_2, c_3, \ldots, c_p\}$, and a change rate of concentration of the target gas G in each unit time o is recorded and its set is recorded as $R=\{r_1, r_2, r_3, \ldots, r_p\}$;

4.11.5, in the case of $R_i > R_{i-1}$, where $1 < i < m$, then adjusting the oil shale underground in-situ conversion heating device and the formation pressure control device to increase an underground in-situ conversion heating temperature and formation pressure of oil shale, with subsequent steps as follows:

4.11.5.1, in the case of $r_{i+1} > r_i$, where $1 < i < m$, and $2 < m \leq p$, where p represents the number of units time, then maintaining the underground in-situ conversion heating temperature and the formation pressure of oil shale;

4.11.5.2, in the case of $r_{i+1} \leq r_i$, where $1 < i < m$, and $2 < m \leq p$, where p represents the number of units time, then adjusting the oil shale underground in-situ conversion heating device and the formation pressure control device to increase the underground in-situ conversion heating temperature and the formation pressure of oil shale;

4.11.6, in the case of $r_i \leq r_{i-1}$, where $1 < i < m$, and $2 < m \leq p$, where p represents the number of units time, then adjusting the oil shale underground in-situ conversion heating device and the formation pressure control device to increase the underground in-situ conversion heating temperature and the formation pressure of oil shale, with subsequent steps as follows:

4.11.6.1, in the case of $r_{i+1} > r_i$, where $1 < i < m$, and $2 < m \leq p$, where p represents the number of units time, then adjusting the oil shale underground in-situ conversion heating device and the formation pressure control device to increase the underground in-situ conversion heating temperature and the formation pressure of oil shale;

4.11.6.2, in the case of $r_{i+1} \leq r_i$, where $1 < i < m$, and $2 < m \leq p$, where p represents the number of units time, then maintaining the underground in-situ conversion heating temperature and the formation pressure of oil shale.

* * * * *